Aug. 22, 1950      J. K. RUSSELL      2,519,506
FILTER
Filed Sept. 27, 1946      2 Sheets-Sheet 1
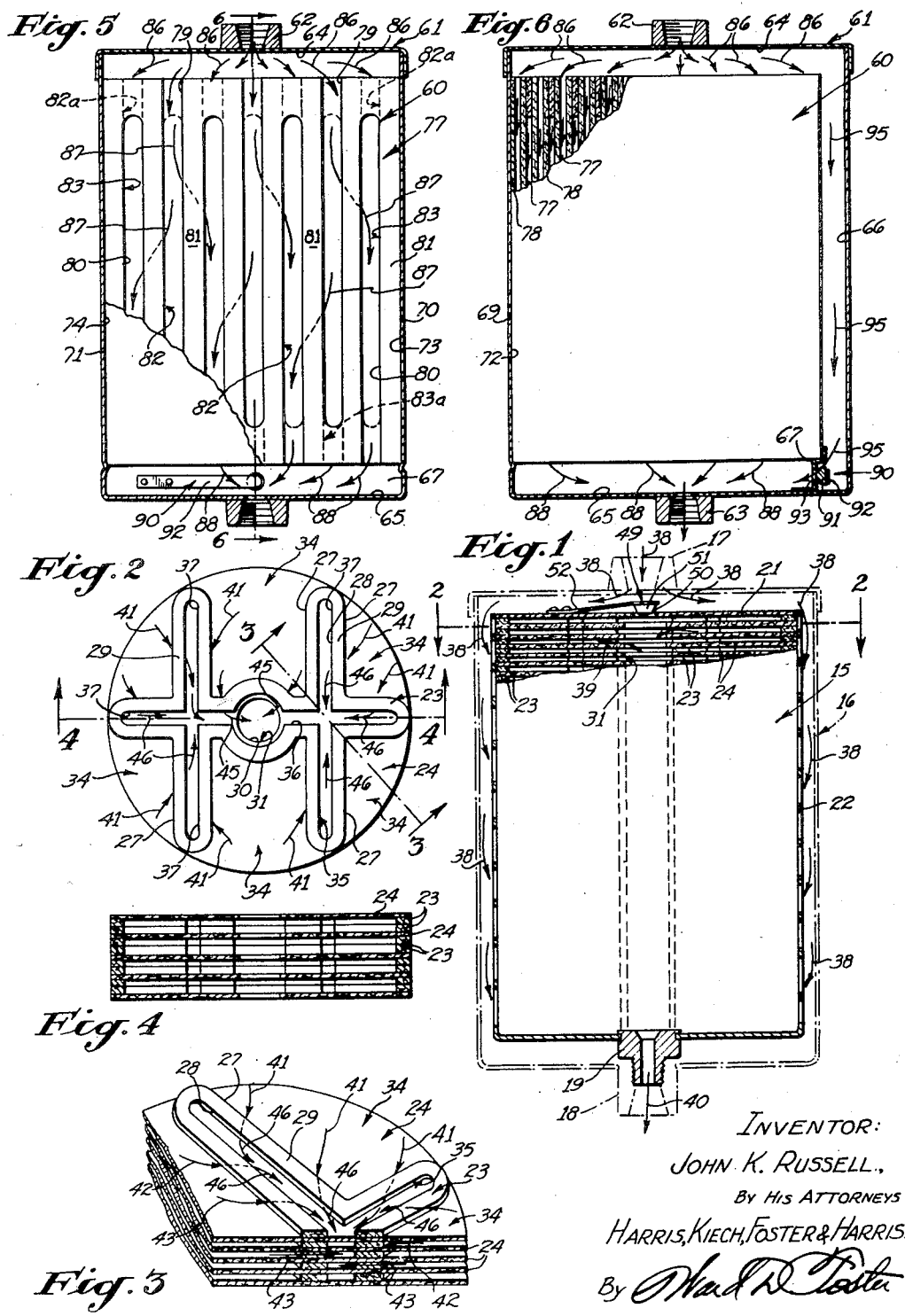
INVENTOR:
JOHN K. RUSSELL,
BY HIS ATTORNEYS
HARRIS, KIECH, FOSTER & HARRIS Aug. 22, 1950 J. K. RUSSELL 2,519,506
FILTER
Filed Sept. 27, 1946 2 Sheets-Sheet 2
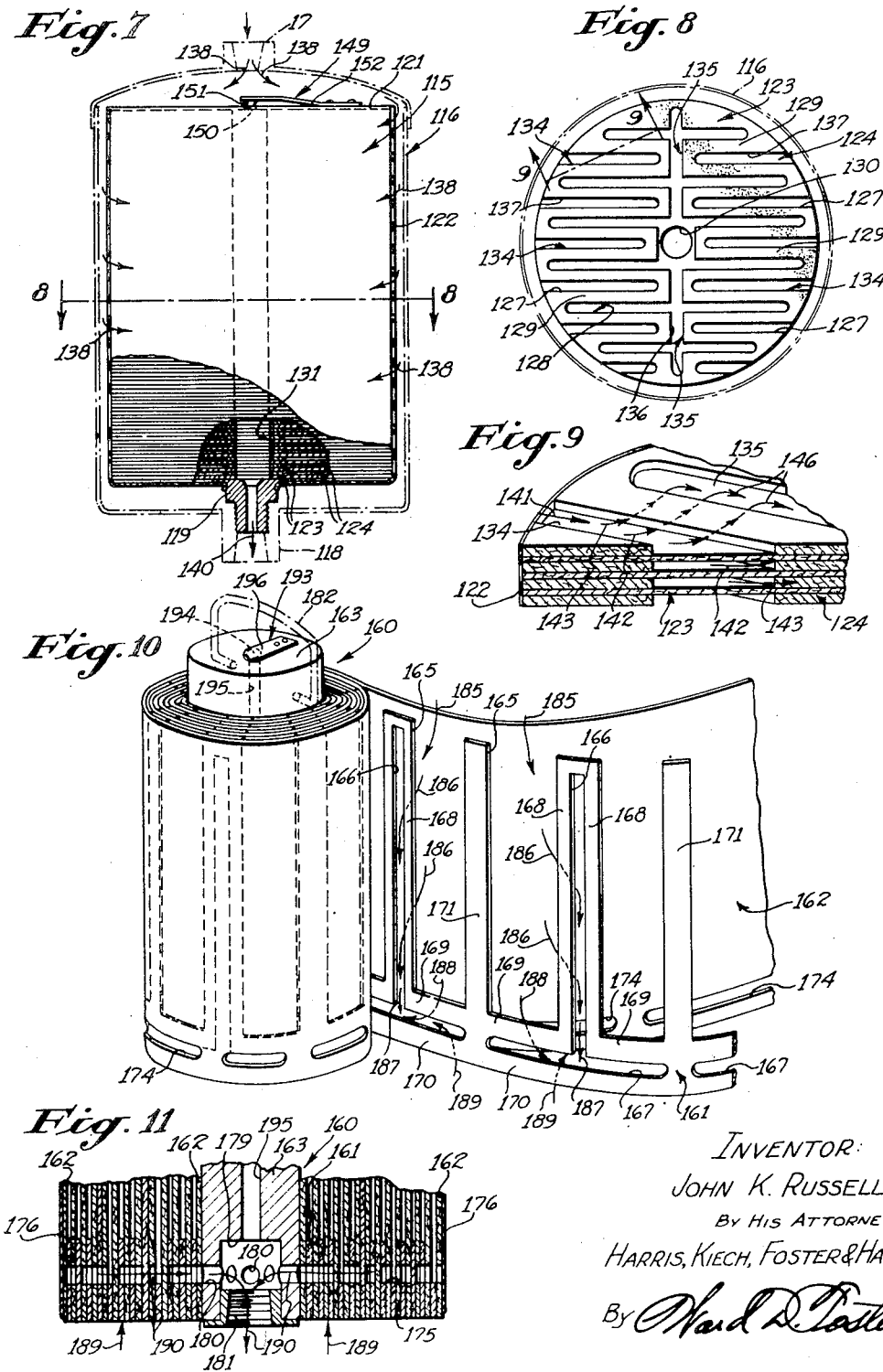
INVENTOR:
JOHN K. RUSSELL,
BY HIS ATTORNEYS
HARRIS, KIECH, FOSTER & HARRIS.
By Ward D. Foster

UNITED STATES PATENT OFFICE 2,519,506

FILTER

John K. Russell, North Hollywood, Calif., assignor to Luber-Finer Incorporated, Los Angeles, Calif., a corporation of California Application September 27, 1946, Serial No. 699,807

8 Claims. (Cl. 210—183)

My invention relates in general to devices for removing foreign matter from fluids and since the fundamental concepts involved are particularly applicable to filters for removing foreign matter suspended in the oil employed for lubricating internal combustion engines, I prefer to consider such embodiments herein for convenience in disclosing the invention. However, since the embodiments considered herein are susceptible to various other applications and since my disclosure will enable those skilled in the art to practice the invention in other forms, it will be understood that I do not intend to restrict my invention to the particular embodiments and field of application considered herein.

In general, it is a primary object of my invention to provide a filter element wherein the oil or other fluid being filtered flows through and/or between a plurality of layers of cohesive filtering material which remove any foreign matter suspended in the oil.

The filtering material is preferably of a fabric or fibrous nature so as to resist disintegration when exposed to the oil thereby preventing a breakdown of the filter element and preventing channeling of the unfiltered oil through the element, which is an important object of the invention.

Another object of the invention is to provide a simple, compact filter element of relatively small dimensions which is adapted to receive large amounts of foreign matter before becoming loaded. A related object is the provision of a filter element which may be used in the oil circulating systems of internal combustion engines for extended periods of time before becoming loaded with foreign matter under normal operating conditions.

More specifically, an object of my invention is to provide a filter element of the foregoing general character wherein alternate layers of the filtering material include elongated portions or strips which separate the spaces between the layers thereadjacent into a plurality of inlet and outlet channels, the inlet channels being adapted to conduct unfiltered oil into the element and being adapted to receive the foreign matter therein, and the outlet channels being adapted to conduct the filtered oil from the element.

A further object of the invention is to provide a filter element wherein the inlet channels are large as compared to the outlet channels so as to provide a maximum of space for receiving the foreign matter removed from the oil.

An important object is to provide a filter element wherein the strips, i. e., the elongated portions of the alternate layers, which separate the inlet channels from the outlet channels are all of substantially uniform width to provide a uniform filtering action throughout the entire element. Another important object is to provide a filter element wherein the total length of all the strips separating the inlet channels from the outlet channels is extremely large as compared to the dimensions of the element so as to provide a large filtering area between the inlet and outlet channels.

A further object is to provide a filter element wherein the aforesaid alternate layers are thicker than the layers thereadjacent and may be of laminated construction to further increase the filtering area between the inlet and outlet channels.

Another important object of my invention is to provide a filter element wherein the resistance to flow offered by the element, the pressure and viscosity of the oil being filtered, the size of the inlet channels in the element, and the number and thickness of the layers of filtering material forming the element are so related as to provide a predetermined filtering rate after the filter element has been in use for a predetermined length of time.

In some forms of my invention, it is an object to provide a filter element comprising a plurality of individual sheets which are stacked one adjacent the other in mutual contact, alternate sheets having a configuration which is different from the sheets thereadjacent so as to provide the inlet and outlet channels.

In another form of my invention, it is an object to provide a filter element comprising a pair of elongated sheets which are wound on a central core in such a manner that each sheet comprises alternate turns thereon, one of the sheets including elongated portions or strips which separate the spaces between the turns of the other sheet into a plurality of inlet and outlet channels.

Still another object of my invention is to provide a filter including thermostatically controlled valve means for preventing flow of oil through the inlet and outlet channels of the filter element when the oil temperature is below a predetermined minimum value, the valve means being adapted to permit normal flow through the filter element as long as the oil temperature is at or above the minimum value.

Additional objects of my invention include the provision of a filter element which is efficient and reliable, which is simple and inexpensive to manufacture, and which may be replaced inexpensively when loaded with foreign matter.

The foregoing objects of my invention and the advantages suggested thereby, together with various other objects and advantages which will be evident hereinafter, may be realized by means of the embodiments which are illustrated in the accompanying drawings and are described in detail hereinafter. Referring to the drawings, which are intended as illustrative:

Fig. 1 is a sectional view of a filter including a filter element which embodies the fundamental principles of my invention, a portion of the element being broken away to reveal the layers of filtering material which form the internal structure thereof;

Fig. 2 is a plan view of the layers of filtering material and is taken along the broken line 2—2 of Fig. 1;

Fig. 3 is a fragmentary, combination perspective and sectional view which is taken along the broken line 3—3 of Fig. 2;

Fig. 4 is a sectional view of a modified form of the embodiment shown in Figs. 1 to 3 and may be considered as being taken along a line similar to the broken line 4—4 of Fig. 2;

Fig. 5 is a sectional view of another embodiment of my invention;

Fig. 6 is a sectional view which is taken along the broken line 6—6 of Fig. 5;

Fig. 7 is a sectional view of still another embodiment of my invention which is similar to that shown in Figs. 1 to 4, inclusive;

Fig. 8 is a sectional view which is taken along the line 8—8 of Fig. 7;

Fig. 9 is a fragmentary, combination perspective and sectional view which is similar to Fig. 3 and which is taken along the broken line 9—9 of Fig. 8;

Fig. 10 is a perspective view of an additional embodiment of my invention showing this embodiment in partially completed form; and Fig. 11 is a sectional view of the embodiment shown in Fig. 10 showing this embodiment in completed form.

Considering first the embodiment of the invention which is shown in Figs. 1 to 4, inclusive, and referring particularly to Fig. 1, I show a cylindrical filter element 15 which is disposed in a container or housing 16, the peripheral wall of the container being spaced from the element to permit flow of oil therebetween. The container 16 includes an inlet fitting 17 and an outlet fitting 18 to which may be connected suitable inlet and outlet lines (not shown) which may, for example, form part of the oil circulating system of an internal combustion engine. The filter element 15 includes an outlet fitting 19 which may be threadedly inserted into one end of the outlet fitting 18 on the container 16, the fitting 19 providing the sole connection between the container and the element so that the element may be installed and/or removed readily, which is an important feature of the invention.

The filter element 15 includes a container 21 having a perforated or foraminous peripheral wall 22, a plurality of individual layers or sheets, all of which are preferably formed of cohesive filtering material, being stacked within the container in contact with each other. The material forming the layers is preferably of a fabric or fibrous nature to resist disintegration by the oil or other liquid, and may, for example, be any commercially available filtering paper suitable for use in filtering a particular liquid. However, I do not intend to be limited to any specific material since various materials may be employed satisfactorily.

The layers of filtering material include primary and secondary sheets 23 and 24, respectively, which are arranged in alternating relationship, the secondary sheets 24 being circular blanks or discs which act as spacers or separators for the primary sheets 23. The primary sheets are generally circular in outline, as best shown in Fig. 2, and each is provided with inwardly-extending openings or cutouts 27 and a labyrinthine central opening 28 therein, the central opening being separated from the openings 27 by a continuous, elongated portion or strip 29. The discs 24 are provided with central openings 30 therein which register with the central portions of the labyrinthine openings 28 to provide an outlet passage 31 for filtered oil which leads to the outlet fitting 19.

As will be discussed in more detail hereinafter, the outer openings 27 in the primary sheets 23 provide inlet spaces or channels 34 which are adapted to conduct unfiltered oil into the element 15 and are adapted to receive foreign matter therein, and the central openings 28 provide outlet channels 35 which lead to the outlet passage 31. As best shown in Fig. 2, each of the outlet channels 35 includes a central channel 36 which communicates with the outlet passage 31, and includes a plurality of branching channels 37 which lead into the central channel.

Considering the general operation of the filter, unfiltered oil flows into the container 16 through the inlet fitting 17 and into the space between the containers 16 and 21 as indicated by the arrows 38 in Fig. 1. The unfiltered oil then flows through the foraminous wall 22 of the container 21 and through the filter element 15 into the outlet passage 31 as indicated by the arrows 39, foreign matter such as solids suspended in the unfiltered oil being removed during flow through the filter element as will be described in detail in the succeeding paragraphs. From the outlet passage 31, the unfiltered oil flows through the outlet fittings 19 and 18 and into a suitable outlet line (not shown) as indicated by the arrow 40.

Considering the flow through the filter element 15 in detail, the unfiltered oil enters the inlet channels 34 between the discs 24 as indicated by the arrows 41 in Figs. 2 and 3. The oil then flows past the strips 29 into the outlet channels 35, foreign matter suspended in the oil being removed therefrom during passage of the oil past the strips 29 and being deposited in the inlet channels 34.

I have not been able to ascertain definitely the exact path followed by the oil in flowing past the strips 29 and, consequently, do not desire to be restricted to the following discussion thereof. However, I believe that some of the oil flows between the strips 29 and the discs 24 in contact therewith, as indicated by the arrows 42 in Fig. 3, and that some of the oil may flow through the strips, as indicated by the arrows 43. Any spaces between the strips 29 and the discs 24 in contact therewith are sufficiently minute to prevent the passage of any foreign matter suspended in the oil while possibly permitting some of the oil to flow therebetween. The texture of the filtering material forming the sheets 23 and 24 is, of course, such that foreign matter cannot pass therethrough during flow of the oil past the strips 29, although some of the oil may do so as previously mentioned.

In any event, after the foreign matter has been removed from the oil and has been deposited in the inlet channels 34 during passage of the oil through and/or around the strips 29, the filtered oil either enters the central portions 36 of the outlet channels 35 directly, as indicated by the arrows 45 of Fig. 2, or enters one of the branching channels 37 and then flows into the central portion communicating therewith, as indicated by the arrows 46 in Figs. 2 and 3. From the central portions 36 of the outlet channels 35, the filtered oil flows into the outlet passage 31 and then out through the fittings 19 and 18 as previously described.

As best shown in Fig. 2, the inlet channels 34 are large as compared to the outlet channels 35 to provide a maximum of space for receiving foreign matter removed from the oil, the outlet channels preferably being elongated and relatively narrow substantially as illustrated. This construction permits the filter element 15 to remove a much larger quantity of foreign matter from the oil before becoming loaded therewith than would otherwise be possible, and thus materially extends the useful life of the element.

It will be noted that the strips 29 are shown as being of substantially uniform width throughout the entire length thereof so that all of the paths along which the oil may flow in traversing the strips are of substantially uniform length. This construction provides substantially uniform resistance to flow through and/or around the strips 29 at all points thereon, thereby providing a substantially uniform filtering action throughout the entire filter element 15 and avoiding any tendency for all of the oil to flow past the strips at only a relatively few points. Such uniform distribution of the flow past the strips 29, coupled with the fact that the sheets 23 and 24 are formed of cohesive, disintegration-resistant material, virtually eliminates any possibility of a breakdown of any portion of the filter element 15 which would permit channeling of unfiltered oil therethrough.

As best shown in Fig. 2, the length of each strip 29 is great as compared to the dimensions of the sheets 23 and 24, thereby providing a large filtering area to provide a large number of paths along which the oil may flow in traveling from the inlet channels 34 to the outlet channels 35, and thereby distributing the flow of oil so that only a minute amount flows past the strips 29 at any one point. The filtering area through which the oil may flow in traversing the strips 29 may be increased by employing primary sheets 23 which are relatively thick as compared to the discs 24, as best shown in Fig. 3. Since the discs 24 merely serve as spacers for the primary sheets 23, the discs are preferably as thin as possible consistent with the strength requirements thereof so that a maximum number of the primary sheets may be employed in a filter element of given dimensions. The filtering area may be further increased by employing primary sheets 23 which are of laminated construction, as shown in Fig. 4, if desired. An incidental and highly desirable result of employing thick primary sheets 23 and thin secondary sheets 24 to increase the filtering area is to increase the capacity of the filter element for foreign matter since such a construction increases the percentage of the total volume of the element which is occupied by the inlet channels 34.

The large filtering areas provided by the foregoing constructions greatly increase the number of minute paths or passages through which the oil may flow in traversing the strips 29, thereby distributing the flow more widely and increasing the efficiency of the filter element. Such a wide distribution of the flow also contributes to the virtual elimination of any possibility of a breakdown of the element which would permit channeling of unfiltered oil therethrough by reducing the quantity of oil flowing through and/or around the strips 29 at any one point to a minute amount.

The useful life of the filter element 15 is dependent upon the relationship between various of the factors which have been discussed individually heretofore, the useful life of the element being considered as the length of time that oil at a specified pressure and of a specified viscosity will flow through the filter element at or in excess of a predetermined minimum rate before the element becomes so loaded with foreign matter that the minimum rate can no longer be maintained under the specified conditions. The relationship of the factors determining the life of the filter element may best be considered in connection with a basic unit of the element, which basic unit may conveniently be taken as one of the primary sheets 23 and one of the secondary sheets 24 in contact therewith.

The first of the factors to be considered is the resistance to flow offered by the aforesaid basic unit of the filter element which is necessary to achieve the desired filtering action, i. e., the resistance to flow which is required to remove the foreign matter from the oil with the desired efficiency. The resistance to flow offered by the basic unit is determined by the porosity of the filtering material and, to some extent, by the width of the strips 29 separating the inlet channels 34 from the outlet channels 35, and must be sufficient to insure the removal of at least a specified minimum percentage of all particles of foreign matter which are larger than a specified minimum size. The flow resistance required to achieve the desired filtering efficiency may be determined experimentally by flowing oil of a specified viscosity and at a specified pressure through the basic unit of the filter element, or preferably through a plurality of such units.

The viscosity of the oil being filtered and the pressures at which the oil enters and leaves each of the basic units are also factors which affect the useful life of the filter element 15 (in accordance with the previous definition of the term "useful life") since the rate of flow of the oil through each basic unit of the element depends upon the resistance to flow offered by the units, the difference between the inlet and outlet pressures of the oil, and upon the viscosity of the oil. The size of the inlet channels 34 in the primary sheet 23 of each of the basic units is an additional factor in the useful life of the filter element 15 in view of the fact that the capacity of the inlet channels for foreign matter determines the length of time that the flow of oil through each basic unit can be maintained at a given rate.

From the foregoing considerations it will be apparent that the resistance to flow offered by a basic unit of the filter element 15, which determines the filtering efficiency of the basic unit, the pressure of the oil, and the viscosity of the oil establish the maximum possible rate at which the oil will flow through the basic unit, and it will further be apparent that the size of the inlet channels 34 in the basic unit establish the length of time that any given rate of flow less than the maximum possible rate can be maintained before the inlet channels become filled with foreign matter to such an extent that the desired flow rate can no longer be maintained.

Thus, the useful life of a basic unit of the filter element 15, i. e., the length of time that flow through the basic unit at or above a specified minimum rate can be maintained, is dependent upon the resistance to flow offered by the unit, the viscosity of the oil, the pressure of the oil, and the capacity of the inlet channels 34 for foreign matter.

Consequently, after establishing the flow rate which can be maintained through each basic unit for the desired length of time under the specified conditions of flow resistance, oil pressure, viscosity, and foreign matter capacity, the number of basic units, or the thickness of the primary sheets 23 of the units, may be increased or decreased as required to provide an element which will filter oil at any desired rate. Thus, the useful life of the filter element 15 depends upon the relationship between the resistance to flow, the oil pressure, the viscosity of the oil, the capacity of the inlet channels, the thickness of the sheets forming the element, and the number of such sheets employed.

Since the resistance of the filter element 15 may be relatively high when the oil being filtered is at a low temperature, particularly when oil of high viscosity is being filtered, I prefer to provide the filter element with thermostatically controlled valve means 49 for by-passing the element when the oil temperature is below a predetermined minimum value, the minimum value being less than the normal operating temperature of the oil so that filtering will take place when the oil is at its normal operating temperature.

Referring to Fig. 1, the upper end of the container 21 which encloses the sheets 23 and 24 of filtering material is provided with an opening 50 therethrough which communicates with the outlet passage 31 and serves as a seat for a valve 51, the valve being mounted on a thermostatic element 52 which is secured to the top of the container. The characteristics of the thermostatic element 52 are such that it unseats the valve 51 when the oil temperature is below the predetermined value so that the oil may flow directly into the outlet passage 31, and seats the valve when the oil temperature reaches the predetermined value so that the oil circulates through the filter element 15 in the manner described. This construction prevents possible damage to the filter element 15 which may result from the development of excessive pressures in pumping cold oil through the element, and also insures an uninterrupted flow of oil regardless of the temperature thereof.

Referring to Figs. 5 and 6, the embodiment illustrated therein includes a filter element 60 of square or rectangular plan form which is disposed in a container 61 having an inlet fitting 62 and an outlet fitting 63. The container 61 is larger than the filter element 60 so as to provide inlet and outlet spaces or passages 64 and 65, respectively, adjacent opposite ends of the element and a by-pass space or passage 66 adjacent one side thereof, the spaces 65 and 66 being separated by a wall 67 which provides a fluid-tight seal therebetween. A seal between the spaces 64 and 65 is provided by fluid-tight engagement of the sides 69, 70 and 71 of the element 60 with the walls 72, 73 and 74, respectively, of the container 61.

The filter element 60 includes a plurality of layers of cohesive filtering material which are of square or rectangular plan form, the layers including primary sheets 77 and secondary sheets 78 arranged in alternating relationship. The secondary sheets 78 are comparable to the discs 24 of the filter element 15 which was discussed previously and serve as spacers or separators for the primary sheets 77.

As best shown in Fig. 5, each of the primary sheets 77 is provided with a plurality of elongated openings 79 which extend inwardly from one end thereof, and is provided with a plurality of additional elongated openings 80 which extend inwardly from the opposite end thereof, each of the primary sheets including an elongated portion or strip 81 which separates the openings 79 from the openings 80 and which is comparable to the strips 29 of the filter element 15 which was discussed previously. The openings 79 communicate with the space 64 and serve as inlet channels 82 for conducting unfiltered oil into the filter element 60, and the openings 80 communicate with the space 65 and serve as outlet channels 83 for the filtered oil, foreign matter being removed from the oil as it flows past the strips 81 and being deposited in the inlet channels in the manner described in connection with the filter element 15.

The sides of the filter element 60 are enclosed in any suitable manner so that the oil can flow only into the upper end of the element and out of the lower end thereof as viewed in Figs. 5 and 6. For example, the sides of the element 60 may be enclosed by winding tape or the like around the stack of sheets 78 and 79 forming the element, or by disposing the stack of sheets in a suitable container (not shown), etc.

The configuration of the primary sheets 77 is such that the sheets may be reversed, i. e., inverted as viewed in Fig. 5, whereby the openings 79 serve as outlet channels instead of inlet channels, and the openings 80 serve as inlet channels instead of outlet channels. If desired, alternate of the primary sheets 77 may be reversed in this manner so that the openings 79 therein communicate with the outlet space 65 to provide outlet channels 83a which are superimposed on the inlet channels 82 in the adjacent primary sheets and which are indicated by dotted lines in Fig. 5. Similarly, the openings 80 in the reversed primary sheets communicate with the inlet space 64 to provide inlet channels 82a which are superimposed on the outlet channels 83 in the adjacent primary sheets. Such an arrangement wherein alternate of the primary sheets 77 are reversed, although not essential, may be desirable to provide more uniform distribution of the inlet and outlet channels throughout the filter element.

The operation of the filter element 60 is similar to that of the filter element 15 which was discussed previously, and will not be considered in detail. It will be apparent that unfiltered oil entering the container 61 through the inlet fitting 62 flows into the inlet space 64 and then into the inlet channels 82 (or into the inlet channels 82a) as indicated by the arrows 86 in Figs. 5 and 6. From the inlet channels, the oil flows through and/or around the strips 81 into the outlet channels 83 (or the outlet channels 83a) as indicated by the arrows 87 in Fig. 5, foreign matter being removed from the oil and being deposited in the inlet channels as the oil flows past the strips. The filtered oil then flows from the outlet channels into the outlet passage 65, as indicated by the arrows 88, and out through the outlet fitting 63. The action of the strips 81 of the filter element 60 in removing foreign matter from the oil is similar to that of the strips 29 of the element 15 and will not be considered in detail, the explanation of the filtering action offered previously in connection with the element 15 being equally applicable to the element 60.

As is the case with the strips 29 of the filter element 15, the strips 81 of the element 60 are of substantially uniform width to provide uniform resistance to flow throughout the entire element, thereby avoiding flow concentrations at a few points. Similarly, the length of the strips 81 is great as compared to the dimensions of the filter element 60 to provide a large filtering area between the inlet channels 82 and the outlet channels 83, thus distributing the flow of oil past the strips so that only a small amount of oil traverses the strips at any one point. As previously discussed, even larger filtering areas may be obtained by making the primary sheets 77 relatively thick and by making the secondary sheets or separators 78 as thin as possible without sacrificing the strength thereof. If desired, the primary sheets 77 may also be of laminated construction.

It will be noted that the capacity of the filter element 60 for foreign matter is less than that of the element 15, since the percentage of the total volume of the element 60 which is composed of the inlet channels 82 is less than the percentage of the total volume of the element 15 which is composed of the inlet channels 34, assuming of course, that the thicknesses of the layers of filtering material forming the elements correspond. However, the capacity of the filter element 60 for foreign matter may be increased by increasing the number and/or size of the inlet channels 82, it being apparent that the amount of foreign matter that either element can contain is dependent upon the total volume of the inlet channels therein.

The filter element 60 is preferably provided with thermostatically controlled valve means 90 for allowing the oil to by-pass the element when the temperature is below a predetermined value for the reasons discussed previously. The valve means 90 includes a valve 91 which is mounted on a thermostatic element 92 and which is adapted to seat in an opening 93 in the wall 67 which separates the spaces 65 and 66. The characteristics of the thermostatic element 92 are such that it seats the valve 91 when the oil temperature is at or above the predetermined value, and unseats the valve when the temperature is below the predetermined value. When the valve 91 is unseated, the oil may flow from the inlet space 64 into the by-pass space 66 and then into the outlet space 65, thus by-passing the filter element 60 as indicated by the arrows 95.

The embodiment of my invention which is shown in Figs. 7 to 9 is similar to that shown in Figs. 1 to 4 and described previously, and consequently will not be described in detail. For convenience, the components of the embodiment of Figs. 7 to 9 are identified by numerals which are greater by 100 than the numerals employed to identify the corresponding components of the embodiment of Figs. 1 to 4 so that the pertinent portions of the description of the latter embodiment may conveniently be applied to the embodiment now under consideration. Thus, the embodiment of Figs. 7 to 9 includes a filter element 115 which may be disposed in a container 116, and which includes a plurality of primary and secondary sheets or layers 123 and 124 providing inlet and outlet channels 134 and 135 therebetween, the inlet and outlet channels being separated by strips 129 and the outlet channels including branching channels 137.

The principal difference between the filter elements 15 and 115 is that the number of inlet channels 134 and the number of branching channels 137 in the element 115 are greater than the number of inlet channels 34 and the number of branching channels 37, respectively, in the element 15. This difference results in the provision of the strips 129 separating the outlet channels 135 from the inlet channels 134 of the element 115 which are substantially longer than the corresponding strips 29 of the element 15 so that the filtering area of the element 115 is correspondingly greater than that of the element 15 to provide a wider flow distribution. However, this wider flow distribution is obtained by sacrificing some of the capacity of the element 115 for foreign matter since the volume of the inlet channels 134 is less than that of the inlet channels 34. Thus, the filtering action of the element 115 is more efficient than that of the element 15 since the oil flows through the element 115 in more minute streams, but the useful life of the element 115 will be less than that of the element 15 under similar operating conditions since the element 115 will become loaded with foreign matter sooner.

The operation of the filter element 115 is similar to that of the element 15 and will not be described in detail, flow through the element 115 being indicated by arrows which are identified by numerals that are greater by 100 than the numerals identifying the corresponding arrows indicating the flow through the element 15. As is the case with the filter element 15, the element 115 may be provided with thermostatically controlled valve means 149 for by-passing the element when the oil temperature is below a predetermined value, the valve means 149 being substantially identical to the valve means 49 of the filter element 15.

In Figs. 10 and 11, I show a filter element 160 which includes a pair of elongated sheets 161 and 162 of filtering material that are wound upon a central core 163 in such a manner that each sheet comprises alternate turns on the core. The turns of the sheets 161 and 162 form a plurality of layers which are comparable to the individual layers or sheets of which the previously discussed filter elements are formed, the only major difference being that the layers formed by alternate turns of the sheets 161 and 162 are all interconnected instead of being individual layers since the sheets are preferably, although not necessarily, continuous for convenience in manufacture.

Employing terminology which is consistent with that used heretofore, the sheet 161 may be termed a primary sheet since the turns thereof form layers which correspond to the primary layers 23 of the filter element 15, for example. Similarly, the sheet 162 may conveniently be termed a secondary sheet since the turns thereof produce layers which correspond to the secondary layers 24, for example, of the filter 15, the turns of the secondary sheet 162 serving as spacers or separators for the turns of the primary sheet 161 as in the filter elements discussed previously.

As best shown in Fig. 10, the primary sheet 161 is provided with a plurality of openings or cut-outs 165 extending inwardly from one edge thereof to provide inlet channels for unfiltered oil or other unfiltered fluid. The primary sheet 161 is also provided with a plurality of elongated openings 166 therein which extend longitudinally of the filter element 160 and which terminate in elongated openings or slots 167 extending circumferentially of the element, the openings 166 serving as outlet channels for filtered oil. The openings or inlet channels 165 are separated from the openings or outlet channels 166 by elongated portions or strips 168 of the primary sheet 161 which extend longitudinally of the filter element 160, and are separated from the openings 167 by circumferentially extending portions or strips 169. The openings 167 are also separated from the end of the filter element 160 thereadjacent by circumferentially extending portions or strips 170. The primary sheet 161 may also include longitudinally extending portions or strips 171 which separate adjacent of the inlet channels 165 from each other.

The secondary sheet 162 is provided with a plurality of circumferentially extending openings or slots 174 which are adapted to register with the slots 167 in the primary sheet 161 to form radial outlet passages 175 as best shown in Fig. 11. In rolling the sheets 161 and 162 on the central core 163, the slots 167 and 174 may not coincide exactly, but will overlap sufficiently to provide outlet passages 175 which are continuous, although such passages may be labyrinthine in form. Consequently, any sectional view such as Fig. 11 would appear to indicate that the outlet passages 175 are obstructed even though this is not the case.

In winding the sheets 161 and 162 on the central core 163, approximately one full turn of the secondary sheet 162 is preferably wound thereon before the first turn of the primary sheet 161 is started so that none of the inlet and outlet channels 165 and 166 will be located immediately adjacent the core as best shown in Fig. 11. Similarly, approximately one full turn of the secondary sheet 162 is wound over the last or outermost turn of the primary sheet 161 to enclose the inlet and outlet channels 165 and 166. The outer ends of the outlet passages 175 are enclosed by winding tape or other suitable material around the outermost turn of the secondary sheet 162 to cover the slots 174 therein as indicated at 176. If desired, tape or the like may be wound around the periphery of the entire element after the sheets 161 and 162 have been wound on the core 163. The inner ends of the radial outlet passages 175 communicate with an outlet passage 179 in the central core 163 through radial openings 180 therein, the passage 179 having an outlet fitting 181 inserted therein.

In use, the filter element 160 is disposed in a suitable container (not shown) which provides a space around the entire element, the container being similar to the container 16, for example, which was discussed previously. The element is preferably provided with a handle 182 thereon for convenience in installing it in or removing it from the container, and may be secured to the container by threadedly connecting the outlet fitting 181 to a suitable outlet fitting on the container in a manner similar to that described previously.

Considering the operation of the filter element 160, some of the unfiltered oil entering the space surrounding the element flows into the inlet channels 165, as indicated by the arrows 185 in Fig. 10, and then past the strips 168 into the outlet channels 166 as indicated by the arrows 186. From the outlet channels 166, the oil flows into the slots 167 and thus into the outlet passages 175 as indicated by the arrows 187 in Fig. 10. Some of the unfiltered oil entering the inlet channels 165 may flow directly into the outlet passages 175 by traversing the strips 169 as indicated by the arrows 188 in Fig. 10, and some of the oil may also flow directly into the outlet passages from the space surrounding the element by traversing the strips 170 as indicated by the arrows 189 in Figs. 10 and 11. From the outlet passages 175, the filtered oil flows into the outlet passage 179 in the core 163 and out through the outlet fitting 181 as indicated by the arrows 190 in Fig. 11.

Foreign matter is removed from the oil in the manner previously described as the oil flows through and/or around the various strips 168, 169 and 170, most of the foreign matter being deposited in the inlet channels 165 while that which is removed from the oil flowing past the strips 170 is deposited in the bottom of the container which encloses the filter element. The inlet channels 165 are preferably as large as possible so that the total volume thereof is large as compared to the volume of the filter element to provide the maximum possible space for foreign matter.

The various strips 168, 169 and 170 which the oil traverses are all of substantially uniform width so that the resistance to flow is substantially uniform throughout the entire filter element, thereby avoiding flow concentrations and providing a uniform filtering action as previously discussed. It will be noted that the total length of the strips 168, 169 and 170 is great as compared to the dimensions of the filter element so as to provide a large filtering area, thereby increasing the filtering efficiency by distributing the flow of oil past the strips so that only a minute amount traverses the strips at any one point. The filtering area may be increased by employing a relatively thick primary sheet 161 and a relatively thin secondary sheet 162 since the turns of the secondary sheet merely serve as spacers for the turns of the primary sheet. The primary sheet may also be of laminated construction as previously discussed, if desired.

The filter element is preferably provided with thermostatically controlled valve means 193 for regulating flow of the oil in accordance with the temperature thereof as previously discussed. The valve means 193 includes a valve 194 which is adapted to seat in a longitudinal opening 195 through the core 163, the valve being carried by a thermostatic element 196 which is adapted to seat the valve when the oil temperature is at or above a predetermined value and which is adapted to unseat the valve at lower oil temperatures. When the valve 194 is unseated, the oil may flow through the bore 195 into the outlet passage 179, thus by-passing the filter element until the oil temperature reaches the desired value.

My invention thus provides filter elements which are adapted to remove large quantities of foreign material from lubricating oils or other fluids before the capacities thereof are reached and which are adapted to remove the foreign matter in an efficient manner. The large filtering areas of the elements result in an efficient filtering action by distributing the flow of oil substantially uniformly throughout the element so that the individual streams of oil which are being filtered are very minute. The structures of the filter elements are also such that the resistance offered to the flow of the oil which is being filtered is as uniform as possible so that the flow will not be concentrated at a relatively few points. Eliminating such flow concentrations and employing layers of cohesive fabric or fibrous materials which are of a somewhat disintegration-resistant nature virtually eliminates any possibility of breakdowns of the filter elements which would permit channeling of unfiltered oil therethrough.

The filter elements are quite compact so that they may be mounted in containers which require only a small space, this being a particularly advantageous feature when the filters are used in connection with the oil systems of automobile engines, for example. The elements are of simple construction and may be manufactured and marketed at a relatively low cost so that they may be replaced inexpensively whenever the capacities thereof are reached.

Although I have disclosed herein various embodiments of my invention which I have described as being particularly adapted for removing foreign matter from lubricating oil, I do not desire to be limited thereto since the embodiments disclosed may be employed for filtering other fluids and since various changes, modifications and substitutions may be incorporated in the embodiments disclosed without departing from the spirit of the invention. Accordingly, I hereby reserve the right to the protection afforded by the full scope of my appended claims.

I claim as my invention:

1. A filter element comprising a plurality of spaced filtering layers of fibrous material and a plurality of spaced separating layers arranged in alternating relationship, each of said filtering layers comprising an elongated, irregular filtering strip of substantially uniform width having opposed surfaces which contact the separating layers thereadjacent, respectively, each of said filtering strips dividing the space between the separating layers thereadjacent into a plurality of inlet channels for unfiltered fluid and a plurality of outlet channels for filtered fluid, the inlet channels between adjacent ones of said separating layers being disposed between the outlet channels between such adjacent separating layers, and the inlet channels between adjacent ones of said separating layers being separated from the outlet channels therebetween by the filtering strip disposed between such adjacent separating layers.

2. A filter element as set forth in claim 1 wherein the inlet channels between adjacent ones of said separating layers are larger than the outlet channels therebetween.

3. A filter element as set forth in claim 1 wherein the outlet channels between adjacent ones of said separating layers are interconnected and wherein said separating layers are provided with openings therethrough which interconnect the outlet channels between adjacent pairs of said separating layers.

4. A filter element as set forth in claim 1 wherein said filtering layers are thicker than said separating layers.

5. A filter element comprising a plurality of spaced filtering layers of fibrous material and a plurality of spaced, separating layers, said filtering and separating layers being arranged in alternating relationship with each of said filtering layers contacting the separating layers thereadjacent, said filtering layers dividing the spaces between said separating layers into channels for a fluid being filtered, and said filtering layers being thicker than said separating layers.

6. A filter element as set forth in claim 5 wherein said filtering layers are of laminated construction.

7. A filter element comprising a plurality of spaced filtering layers of fibrous material and a plurality of spaced, separating layers, said filtering and separating layers being arranged in alternating relationship with each of said filtering layers contacting the separating layers thereadjacent, each of said filtering layers being provided with an elongated, central, primary opening which extends substantially thereacross and which is closed at its ends, and being provided with a plurality of elongated, secondary openings which extend transversely of said primary opening, each of said secondary openings in each of said filtering layers being closed at one end and communicating with the primary opening therein at its other end, said separating layers having openings therethrough which register with said primary openings in said filtering layers intermediate the ends of said primary openings.

8. A filter element as set forth in claim 7 wherein each of said filtering layers is provided with a plurality of tertiary openings which extend inwardly between the primary and secondary openings therein, each of said tertiary openings being open at its outer end and closed at its inner end.

JOHN K. RUSSELL.

REFERENCES CITED

The following references are of record in the file of this patent:

UNITED STATES PATENTS

| Number | Name | Date |
| --- | --- | --- |
| 425,431 | Hyatt | Apr. 15, 1890 |
| 984,705 | Barick | Feb. 21, 1911 |
| 1,641,485 | Heftler | Sept. 6, 1927 |
| 1,793,583 | Bowden | Feb. 24, 1931 |
| 1,849,582 | Lundborg | Mar. 15, 1932 |
| 1,989,598 | Kline | Jan. 29, 1935 |
| 2,141,436 | Harris | Dec. 27, 1938 |
| 2,294,330 | Clark | Aug. 25, 1942 |
| 2,322,548 | Sigmund | June 22, 1943 |
| 2,339,703 | Kamrath | Jan. 18, 1944 |
| 2,359,475 | Gauthier | Oct. 3, 1944 |
| 2,427,862 | Judkins | Sept. 23, 1947 |

Certificate of Correction

August 22, 1950

Patent No. 2,519,506

JOHN K. RUSSELL

It is hereby certified that error appears in the printed specification of the above numbered patent requiring correction as follows:

Column 4, line 46, for the word "unfiltered" read *filtered*;

and that the said Letters Patent should be read as corrected above, so that the same may conform to the record of the case in the Patent Office.

Signed and sealed this 21st day of November, A. D. 1950.

[SEAL]

THOMAS F. MURPHY,
*Assistant Commissioner of Patents.*